Sept. 11, 1962  J. A. ADLOFF ETAL  3,053,366
AUTOMATIC CLUTCH FOR MOTOR VEHICLES
Filed Oct. 6, 1959  2 Sheets-Sheet 1

INVENTORS
Jakob August Adloff,
Otto Haertel, and
BY Wilhelm Riehl
R. L. Spencer
Attorney

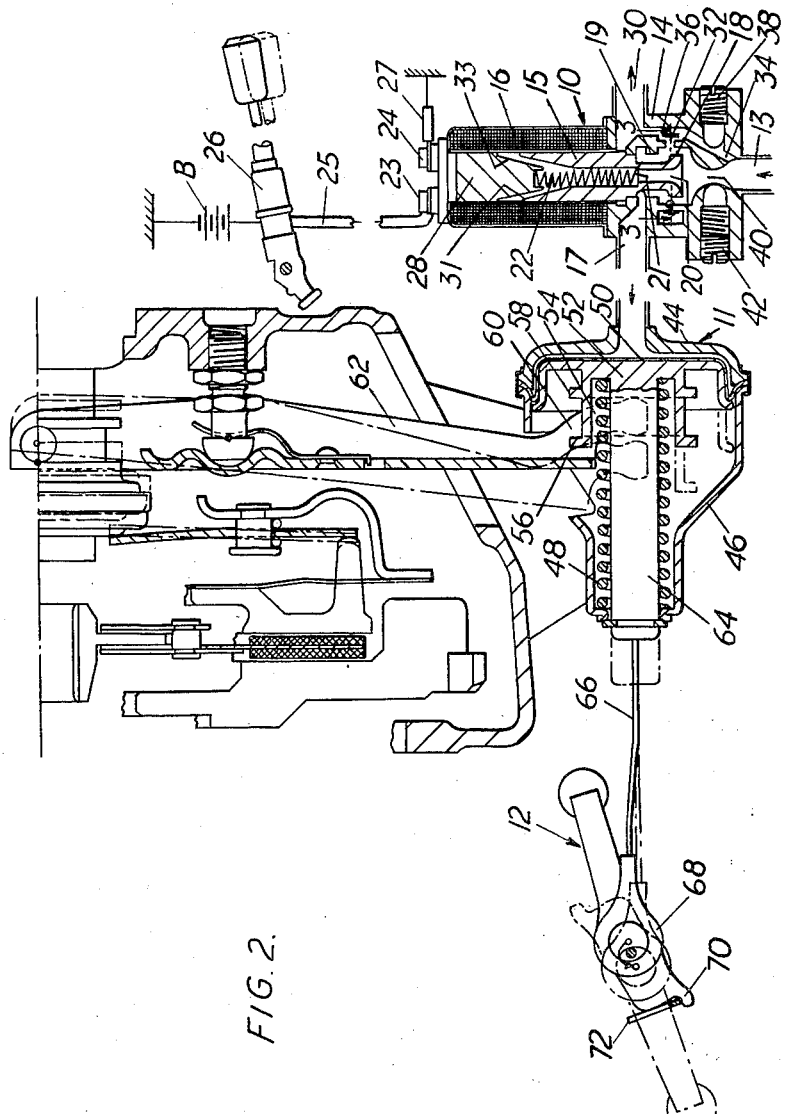

United States Patent Office 3,053,366
Patented Sept. 11, 1962

3,053,366
AUTOMATIC CLUTCH FOR MOTOR VEHICLES
Jakob August Adloff, Main-Gonsenheim, Otto Haertel, Russelsheim (Main), and Wilhelm Riehl, Raunheim (Main), Germany, assignors to General Motors Corporation, Detroit, Mich., a corporation of Delaware
Filed Oct. 6, 1959, Ser. No. 844,742
Claims priority, application Germany Oct. 18, 1958
12 Claims. (Cl. 192—85)

This invention relates to automatic clutches for motor vehicles.

According to the invention a clutch-operating lever is actuable by a power element supplied with energy by a control element responsive to the operating temperature of the engine and the engine speed.

The automatic clutch according to the invention adapts itself well to the changeable operating conditions in a motor vehicle and fulfils the requirement of gradual and gentle clutch engagement during starting and during changes in gear ratio under all working conditions of the engine. When the engine is warmed up and the throttle of the carburettor is opened quickly, the clutch engagement is gradual, whilst for cold starting the engagement speed of the clutch is higher, so that the clutch engages only when the engine has reached a speed at which sufficient torque is delivered. When a change in the transmission ratio is required, the clutch is released quickly and completely.

The scope of the invention is defined by the appended claims; the invention and how it can be performed are hereinafter particularly described with reference to the accompanying drawings, in which:

FIGURE 2 is a schematic view on an enlarged scale, partly in section, of a motor vehicle clutch and gearshift lever together with the units of the automatic clutch.

Figure 1:
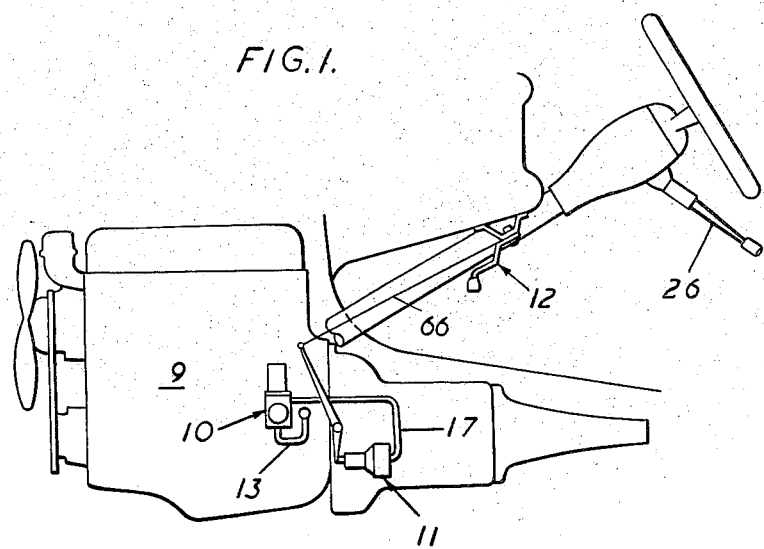
FIGURE 1 is a schematic side view of the engine of a motor vehicle with a clutch and gear transmission, and shows a manual gearshift lever on the steering column and the arrangement of the various units of one embodiment of an automatic clutch according to the invention.

As shown in the drawings, the automatic clutch consists essentially of a control element 10, a power element 11 and a double-arm hand lever 12 serving as a lock. In the embodiment shown, the power element 11 is energized hydraulically: the pressure medium necessary for energizing the power element 11 is taken from the pressure-lubrication system of the engine at a suitable place, for example at the oil switch, and fed to the power element 11 via the control element 10. At the same time the oil switch (not shown) is so regulated that the usual pilot lamp (also not shown) on the instrument panel is extinguished just when the pressure supplied is sufficient to engage the clutch. The hydraulic pressure derived from the lubrication system of the engine 9 passes through a line 13 into the control element 10.

THE CONTROL ELEMENT 10

The control element 10 consists essentially of a valve housing 14 in which a plunger 15 actuated by a solenoid 16 permits or prevents flow of the pressure medium from the line 13 into a pressure cylinder line 17. At the lower end of the plunger 15 there are valve seat faces 18 which co-operate with valve faces 19 in the valve housing 14. The plunger 15 has a central bore 20, the upper portion of which is enlarged to form shoulders 21 receiving the pressure from a helical spring 22 which abuts against a fixed portion 28 of the solenoid 16 and keeps the plunger 15 in its lowermost position. The solenoid 16 has two terminals 23 and 24, the first of which is connected via a line 25 to one pole of a tumbler switch (not shown) incorporated in a manual gearshift lever 26. The other terminal 24 of the solenoid is earthed through a line 27. When the manual gearshift lever 26 is moved, to select another gear speed, into the position indicated in dash-dotted lines, the tumbler switch incorporated in the gearshift lever 26 is closed. The car battery B used as a current source can then supply a current through the tumbler switch via the line 25, the terminal 23, the solenoid 16, the terminal 24 and the line 27 to earth. This current energises the solenoid 16; the plunger 15 then moves upwards against the action of the helical spring 22 until the faces 18, 19 prevent flow of pressure medium from the line 13 to the pressure cylinder line 17.

Pressure oil can nevertheless flow through the central bore 20 of the plunger 15 to the upper side of the plunger, where there is an oblique face 31 situated opposite a corresponding oblique face 33 on the fixed portion 28. The plunger 15 is thus relieved of pressure, and, when the solenoid is energised, the plunger moves rapidly and suddenly into its upper-most position.

Figure 3:
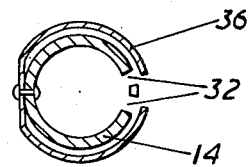
FIGURE 3 is a cross-section along the line 3—3 in FIG. 2.

The valve body also has a return line 30 through which the pressure medium can flow back to the oil sump of the engine 9. The valve housing 14 contains two by-passes 32 and 34 for modifying the fluid pressure supplied respectively to the pressure cylinder line 17 and the power element 11 (see also FIG. 3). Delivery through the first by-pass 32 is regulated by a bimetallic strip 36: when the pressure oil is cold this by-pass 32 is fully open, so that less pressure medium is then supplied to the power element 11 through the pressure cylinder line 17, whereas when the pressure oil becomes warmer the aperture of the by-pass 32 is progressively closed until full pressure is imparted to the power element 11. Consequently, for a given speed of the oil pump, less pressure will be delivered to the power element 11 when the engine is cold than when the engine has warmed up. Thus when the engine is cold the pressure in the power element 11 necessary for actuating the clutch will be reached only when the pressure-oil pump is running at higher speed, i.e. only when engine revolutions are higher. This feature of the clutch construction also eliminates dependence upon the viscosity of the operating medium. By adjustment of the cross-sections of the by-pass 32 and the characteristic of the bimetallic strip in conjunction with the helical spring 22 and the valve travel, it is possible to adapt the shape of the oil-pressure curve—and therefore the engagement of the clutch—to the requirements resulting from the operating condition of the engine.

The second by-pass 34 in the valve housing 14 contains an adjusting screw 38 for varying the cross-sectional area of the by-pass 34, this having the effect of varying the cross-sectional area of the connecting duct from the line 13 to the return line 30. Consequently it is possible to vary the engagement pressure of the clutch and also to allow for reduction of the pressure in the course of time owing to wear on the engine bearings and the pressure-oil pump. An input passage 40 of the control element 10 may have a further throttling screw 42: throttling by means of this screw 42 delays inflow of pressure fluid, so that the clutch does not engage with a jerk when rapid opening of the carburetter throttle causes the speed of the engine to rise suddenly.

THE POWER ELEMENT 11

The power element 11 consists essentially of an hydraulic cylinder having housing portions 44 and 46 in which a diaphragm piston 50, 52 can slide against the action of a helical spring 48. One end of this helical spring abuts against the housing portion 46; the other rests in a recess 54 in the piston 52. The spring thus forces the piston to the right into a rest position as shown in FIG. 2.

The piston 52 has an annular groove 60 which is bounded by two flanges 56, 58 and which carries a clutch-operating lever 62.

When the diaphragm piston 50, 52 is in the rest position shown in FIG. 2, the clutch is disengaged. When pressure medium is supplied to the power element 11 through the line 17, the piston 50, 52 moves to the left (as seen in FIG. 2) against the force of the spring 48 and moves the clutch-operating lever 62 along with it into the position indicated in dash-dotted lines in FIG. 2. In this position of the clutch-operating lever 62 the clutch is engaged.

The piston 50, 52 has an extension 64, which is connected by means of a Bowden cable 66 to an eccentric 68 actuated by the double-arm hand lever 12 (see also FIG. 1). With the hand lever 12 in the position indicated in full lines in FIG. 2, the diaphragm piston 50, 52 can assume the extreme right-hand position shown in FIG. 2; in this position, with the engine stationary, the clutch is disengaged. If for some reason, for example when the vehicle is being pushed or is coasting downhill, the automatic clutch-operating system is switched off with the engine very cold, the hand lever 12 is thrown into the position indicated in dash-dotted lines in FIG. 2. The result is that the Bowden cable 66 is pulled up via the eccentric 68, and the diaphragm piston 50, 52 is held in the extreme left-hand position shown in FIG. 2, in opposition to the action of the spring 48, so that the clutch-operating lever 62 is brought into and held in the position indicated in dash-dotted lines in FIG. 2. A lug 70 at one end of the manual lever 12 can engage an abutment 72 fixed to the vehicle and so hold the hand lever 12 in its normal position. When the engine is stationary and the hand lever 12 is in the position indicated in full lines in FIG. 2, the clutch is disengaged.

*Operation*

When the engine is started up and the manual gearshift lever 26 is operated to change the gear ratio, the pressure pump of the engine 9 delivers pressure medium to the control valve 10 via the line 13.

As already mentioned, when the engine is cold—and the pressure medium therefore also cold—the by-pass 32 is completely open. As the shifting operation has ended and the magnet 16 is de-energised, the magnetic valve 15, 16 is at its lowermost position, as shown in FIG. 2, due to the action of the helical spring 22, so that pressure medium can also flow past the valve faces 18, 19 over the pressure cylinder line 17 and into the power element 11. When the pressure delivered by the oil pump reaches a predetermined value—when this takes place depends on the position of the by-passes 34 and 32 in the control element 10—the pressure of the medium causes the diaphragm piston 50, 52 to move to the left (as seen in FIG. 2) in opposition to the action of the helical spring 48 and at the same time take the clutch-operating lever 62 along with it, thereby engaging the clutch. Under the action of the throttling screw 42, this operation is completed gradually and with a time delay, so that the clutch engages very gently.

Tests have shown that engagement of the clutch is so gentle that it is possible to start in high gear without a jerk. If the engine 9 delivers too little torque to set the vehicle in motion, the engine speed drops; before the engine stalls, however, the pressure in the power element 11 drops by such an amount that the diaphragm piston moves back a little under the action of the spring 48, so that the clutch slips. Thus the load on the engine is reduced and its speed builds up again. This process of gentle engagement followed by disengagement of the clutch takes place until the vehicle speed has increased to a value corresponding to engine speed. With the automatic clutch according to the invention, even an unskilled driver can therefore start the vehicle in any gear. Even if a driver has to reduce his speed very suddenly in town traffic, it is no longer absolutely necessary to change down into a lower gear before accelerating again.

If a change in the gear ratio is desired by operation of the manual gearshift lever 26, movement of this lever to initiate the shift action brings it into the position indicated in dash-dotted lines in FIG. 2, in which the tumbler switch in the lever is closed. As described above, a current then flows through the line 25, the terminal 23, the solenoid 16, the terminal 24 and the line 27 to earth. The solenoid 16 is thus energised and the plunger 15 moves upwards against the action of the helical spring 22 into the position shown in FIG. 2. The result is that the valve faces 18, 19 shut off the supply of pressure medium to the power element 11, whilst at the same time the pressure upstream of the diaphragm piston 50, 52 is released via the line 30. Under the action of the helical spring 48, the diaphragm piston 50, 52 then moves to the right (as seen in FIG. 2) and takes the clutch-operating lever 62 back into the position indicated in full lines in FIG. 2, thus disengaging the clutch.

Energisation of the solenoid 16 causes the plunger 15 to move upwards suddenly and thus close the valve 18, 19 with great speed, so that disengagement of the clutch is rapid and is complete when the gearshift operation is initiated. As soon as the shift operation is completed and the hand lever 26 returns to its normal position, the circuit is broken again by the tumbler switch incorporated in this lever. Under the action of the helical spring 22, the plunger 15 of the solenoid 16 returns to the lower most position indicated in FIG. 2 and the clutch is actuated as described above in accordance with the existing operating conditions.

We claim:

1. In an automatic clutch supplied by the engine lubrication pressure-oil system of a motor vehicle, a power element in the form of a hydraulic cylinder having a diaphragm piston, a clutch operating lever operatively connecting said clutch to said piston, a control unit hydraulically connected to said cylinder and said engine lubrication system, said control unit including a valve effective in a first position to block off said cylinder from exhaust and to hydraulically connect said cylinder to said engine lubrication pressure system to engage said clutch and effective in a second position to block-off said cylinder from said engine-lubrication pressure system and to connect said cylinder to exhaust to release said clutch, means normally biasing said valve to said first position, manually controlled means for moving said valve to said second position, a by-pass passage in said control unit effective to by-pass pressure from said engine lubrication system back to said engine irrespective of the position of said valve, and temperature responsive means in said control unit for varying the flow of pressure fluid through said by-pass passage.

2. In an automatic clutch according to claim 1, a hand lever operatively connected to the power element to permit locking of the power element in the clutch engaged position in the absence of fluid pressure in the power element.

3. In an automatic clutch according to claim 1, a second by-pass passage in said control unit for reducing the energy supplied to the power element to engage said clutch, and an adjusting screw projecting into said second passage to permit alteration of the cross-sectional area of said second by-pass passage, means for subjecting the energizing of the power element to a time delay comprising a throat for admitting fluid from said engine lubrication pressure system to said control unit and an adjusting screw for varying the cross-sectional area of said throat.

4. In a clutch control system for controlling the engagement and release of an engine driven clutch, said engine providing a source of hydraulic fluid under pressure and a sump, a fluid pressure responsive servo motor operatively connected to said clutch, a control unit hydraulically connected to said servo motor and to said fluid pressure source for controlling engagement and release of said clutch, said control unit including a housing having a control valve therein, said valve being effective in a first position to block off said servo motor from said sump and to hydraulically connect said servo motor to said fluid pressure source and effective in a second position to block off said servo motor from said fluid pressure source and to connect said servo motor to said stump, a spring yieldably urging said valve to said first position, manually operable means for moving said valve to said second position, a central bore extending through said valve for permitting unrestricted free flow of hydraulic fluid through said valve to facilitate movement of said valve from either of said positions to the other of said positions, a by-pass passage in said housing continuously effective to connect said fluid pressure source to said sump irrespective of the position of said valve, and a temperature responsive element in said by-pass passage effective to control the rate of fluid flow through said by-pass passage irrespective of the position of said valve, said temperature responsive element comprising a bimetallic strip arranged to progressively decrease the flow of fluid through said by-pass passage with a rise in temperature of said strip.

5. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to block off said servo motor from said sump and to connect said servo motor to said fluid pressure source to engage said clutch and effective in a second position to block off said servo motor from said fluid pressure source and to connect said servo motor to said sump to release said clutch, spring means yieldably biasing said valve to said first position, manually controlled means for moving said valve to said second position, a by-pass passage in said housing continuously effective to connect said fluid pressure source to said sump irrespective of the position of said valve, and a temperature responsive element in said by-pass passage for controlling the rate of fluid flow through said by-pass passage irrespective of the position of said valve.

6. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to connect said servo motor to said fluid pressure source to engage said clutch and effective in a second position to block off said servo motor from said fluid pressure source and to connect said servo motor to said sump to release said clutch, spring means yieldably biasing said valve to said first position, manually controlled means for moving said valve to said second position, a by-pass passage in said housing continuously effective to connect said fluid pressure source to said sump irrespective of the position of said valve, a temperature responsive flow control element for controlling the rate of fluid flow through said by-pass passage independently of the position of said valve, and a second by-pass passage in said housing connecting said fluid pressure source to said sump.

7. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to block off said servo motor from said sump and to connect said servo motor to said fluid pressure source to engage said clutch and effective in a second position to block off said servo motor from said fluid pressure source and to connect said servo motor to said sump to release said clutch, spring means yieldably biasing said valve to said first position, manually controlled means for moving said valve to said second position, a by-pass passage in said housing continuously effective to connect said fluid pressure source to said sump irrespective of the position of said valve, a temperature responsive flow control element comprising a bimetallic strip for controlling the rate of fluid flow through said by-pass passage independently of said valve, said flow control element being positioned when cold to permit maximum fluid flow through said by-pass passage and being movable in response to rise in temperature thereof to progressively restrict fluid flow through said by-pass passage.

8. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to connect said servo motor to said fluid pressure source to engage said clutch and effective in a second position to block off said servo motor from said fluid pressure source and to connect said servo motor to said sump to release said clutch, spring means yieldably biasing said valve to said first position, manually controlled means for moving said valve to said second position, a by-pass passage in said housing continuously effective to connect said fluid pressure source to said sump irrespective of the position of said valve, a temperature responsive flow control element for controlling the flow of fluid through said by-pass passage indepedently of said valve, a second by-pass passage in said housing for permitting fluid flow from said source to said sump, and manually adjustable means for controlling fluid flow through said second by-pass passage.

9. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to connect said servo motor to said fluid pressure source to engage said clutch and effective in a second position to block off said servo motor from said fluid pressure source and to connect said servo motor to said sump to release said clutch, spring means yieldably biasing said valve to said first position, manually controlled means for moving said valve to said second position, a by-pass passage in said housing continuously effective to connect said fluid pressure source to said sump irrespective of the position of said valve, a temperature responsive element for controlling the flow of fluid through said by-pass passage independently of the position of said valve, and manually adjustable means for controlling the rate of fluid flow from said source of fluid pressure into said control unit.

10. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said servo motor and to said fluid pressure source for controlling engagement and release of said clutch, said control unit including a housing having a hydraulically balanced valve therein, said valve being effective in a first position to connect said servo motor to said fluid pressure source to engage said clutch and effective in a second position to block off said servo motor from said fluid pressure source and to connect said servo motor to said pump to release said clutch, spring means yieldably biasing said valve to said first position, manually controlled means for moving said valve to said second position, a by-pass passage in said housing continuously effective to connect said fluid pressure source to said sump irrespective of the position of said valve, a temperature responsive flow control element for controlling fluid flow through said by-pass passage independently of said valve, a second by-pass passage in said housing connecting said fluid pressure source to said sump, manually adjustable means for controlling fluid flow through said second by-pass passage, and additional manually adjustable means for controlling the rate of fluid flow from said fluid pressure source into said control element.

11. In a clutch control system for controlling the engagement and release of an engine driven clutch, said engine providing a source of hydraulic fluid under pressure and a sump, a fluid pressure responsive servo motor operatively connected to said clutch, means yieldably biasing said servo motor to release said clutch, a control unit hydraulically connected to said fluid pressure source and to said servo motor, said control unit including a housing having a hydraulically balanced valve therein, said valve being effective in a first position to block off said servo motor from said sump and to hydraulically connect said servo motor to said fluid pressure source to engage said clutch, means yieldably biasing said valve to said first position, said valve being effective in a second position to block off said servo motor from said fluid pressure source and to connect said servo motor to said sump to release said clutch, manually controlled means for moving said valve to said second position, a by-pass passage in said housing for connecting said fluid pressure source to said sump independently of the position of said valve, a temperature responsive element in said housing for regulating fluid flow through said by-pass passage, and manually operable means for positioning said servo motor to engage said clutch independently of said control unit.

12. In an automatic clutch supplied by the engine lubrication pressure-oil system of a motor vehicle, a power element comprising a cylinder having a piston therein, a clutch operating lever connecting said clutch to said piston, a control unit hydraulically connected to said cylinder and said engine lubrication system, said control unit including a valve effective in a first position to connect said cylinder to said engine lubrication system to engage said clutch and effective in a second position to block off said cylinder from said engine lubrication pressure system and to connect said cylinder to exhaust to release said clutch, means yieldably biasing said valve to said first position, manually controlled means for moving said valve to said second position, two by-passes in said control unit for reducing the energy supplied to the power element to engage said clutch, a throat in one of said by-pass passages of variable cross section, a thermosensitive device responsive to the operating temperature, means for altering the cross-sectional area of said throat in accordance with the setting of the thermosensitive device, and an adjusting screw projecting into the other by-pass passage to permit alteration of the cross-sectional area of said other by-pass passage.

References Cited in the file of this patent

UNITED STATES PATENTS

| 2,505,450 | Wemp | Apr. 25, 1950 |
| 2,893,526 | Smirl | July 7, 1959 |

FOREIGN PATENTS

| 679,669 | Great Britain | Sept. 24, 1952 |